US012804081B2

(12) United States Patent
Ogaki

(10) Patent No.: US 12,804,081 B2
(45) Date of Patent: Nov. 17, 2026

(54) INFORMATION PROVISION SYSTEM AND INFORMATION PROVISION METHOD INDICATING STATE OF A DEVICE

(71) Applicant: CANON KABUSHIKI KAISHA, Tokyo (JP)

(72) Inventor: Tetsuro Ogaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 224 days.

(21) Appl. No.: 18/757,168

(22) Filed: Jun. 27, 2024

(65) Prior Publication Data

US 2025/0008027 A1 Jan. 2, 2025

(30) Foreign Application Priority Data

Jun. 29, 2023 (JP) ................................ 2023-107294

(51) Int. Cl.
*H04N 1/00* (2006.01)

(52) U.S. Cl.
CPC ..... *H04N 1/00039* (2013.01); *H04N 1/00068* (2013.01)

(58) Field of Classification Search
CPC .......... H04N 1/00029; H04N 1/00037; H04N 1/00039; H04N 1/00068; H04N 1/00084; G06F 3/1229
See application file for complete search history.

(56) References Cited

U.S. PATENT DOCUMENTS

| | | | | |
|---|---|---|---|---|
| 10,904,400 | B2 * | 1/2021 | Kobayashi ......... | H04N 1/00477 |
| 2009/0213418 | A1 * | 8/2009 | Kaneko .............. | H04N 1/00344 358/1.15 |
| 2013/0301071 | A1 * | 11/2013 | Kikuchi ................ | G06F 3/1204 358/1.13 |

FOREIGN PATENT DOCUMENTS

| | | |
|---|---|---|
| JP | 2009206788 A | 9/2009 |

* cited by examiner

*Primary Examiner* — Kent Yip
(74) *Attorney, Agent, or Firm* — Canon.U.S.A., Inc. IP Division

(57) ABSTRACT

An information provision system includes one or more memories storing instructions, and one or more processors configured to execute the instructions to search for a device, display information on the searched device, search for other devices that are related to the searched device which require treatment as related devices based on information on the searched device, and display information indicating an order of urgency of the related devices that require the treatment.

18 Claims, 10 Drawing Sheets

FIG. 10

1001

| Group name | Device ID | Customer name | Installation location | State | Consumable component | Update date and time |
|---|---|---|---|---|---|---|
| AAA | DEV11111 | XX | YY building ZZ floor | | | 2022/2/22 |
| | DEV55555 | DD | FF floor | ! | | 2022/2/22 |
| | DEV22222 | XX | YY building QQ floor | ! | | 2022/2/22 |
| | DEV66666 | GG | GG building AA floor | | | 2022/2/22 |
| BBB | DEV77777 | HH | KK floor | ! | | 2022/1/25 |
| | DEV88888 | HH | JJ floor | | | 2022/1/25 |
| | DEV99999 | PP | LL building ZZ floor | | | 2022/1/25 |
| CCC | DEV99999 | MM | SS floor | | | 2022/2/25 |

INFORMATION PROVISION SYSTEM AND INFORMATION PROVISION METHOD INDICATING STATE OF A DEVICE

BACKGROUND

Field

The present disclosure relates to an information provision technology in device management.

Description of the Related Art

Conventionally, systems that collect information from image forming devices (hereinafter referred to as devices) such as printers and manage states of the devices have been constructed. In such a system, a management server can manage an occurrence status of errors in the device, a degree of wear of a component, or a failure status of a component, and the like, by receiving information from the device. Based on these types of management information, this system provides information necessary for error response such as information on replacement and cleaning of components necessary for error response on the device, information on components whose use periods are near an end of a lifespan, or information on components that are likely to cause a failure to an administrator side. As a result, an engineer on the administrator side is able to efficiently perform an appropriate treatment on the device.

For example, in Japanese Patent Application Laid-open No. 2009-206788, a technology that performs analysis processing to determine whether treatment such as a repair is required not only for a target device for which a user has requested repair, but also for devices belonging to the same group is disclosed. This technology makes it possible to perform treatment on a plurality of devices belonging to the same group at once, or to allow engineers to be efficiently dispatched for repairs.

In a management system as described above, when treatment is required to be performed on the plurality of devices, an even more efficient response is required, and there is room for system improvement to improve work efficiency.

SUMMARY

The present disclosure provides an information processing technology that can improve work efficiency.

The information provision system includes one or more memories storing instructions, and one or more processors configured to execute the instructions to search for a device, display information on the searched device, search for other devices that are related to the searched device that require treatment as related devices based on information on the searched device, and display information indicating an order of urgency of the related devices that require the treatment.

Further features of the present disclosure will become apparent from the following description of exemplary embodiments with reference to the attached drawings.

BRIEF DESCRIPTION OF THE DRAWINGS

FIG. 10 is a diagram which shows an example of the related device display screen of all groups.

DESCRIPTION OF THE EMBODIMENTS

Figure 1:
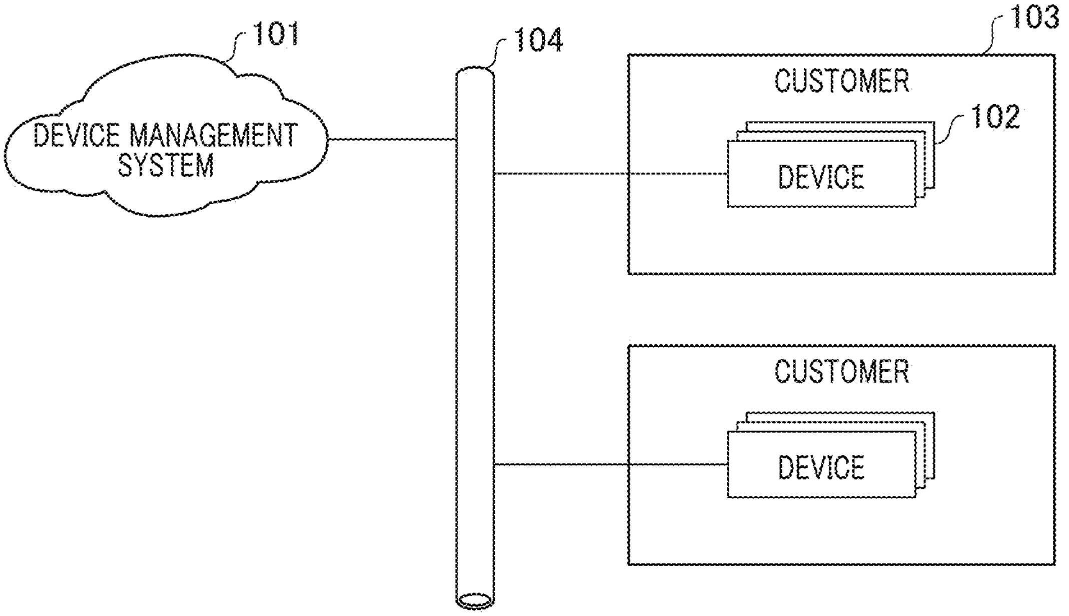
FIG. 1 is a diagram which shows an example of an overall configuration of a system including a device management system according to a first embodiment.

Embodiments of the present disclosure will be described below with reference to the drawings. In the drawings, components having the same configuration or function are denoted by the same reference numerals, and repeated explanations thereof will be omitted. The constituents shown in the following embodiments are merely examples, and the present disclosure is not limited to the shown constituents.

First Embodiment

<System Configuration>

FIG. 1 is a diagram which shows an example of an overall configuration of a system. This system includes a device management system (hereinafter referred to as a management system) 101 according to an embodiment, and a plurality of devices 102 that can be connected to this management system 101 via a network 104. The management system 101 is an example of an information provision system that provides various types of required information to an administrator who manages the device 102 and a customer 103 who uses the device 102.

The management system 101 can be constructed using a cloud computing technology.

The management system 101 centrally manages a plurality of devices 102. Specifically, the management system 101 manages various settings and an operating status of each device 102 by collecting information (to be described below) on the device 102 that each device 102 has.

The management system 101 is configured from, for example, a plurality of servers on a cloud, but may also be realized by a single server. Alternatively, the management system 101 may be configured by a server instead of a cloud.

The device 102 is an image forming device such as a printer, a scanner, or a multi-function peripheral (MFP), and has functions such as printing, scanning, faxing, and copying.

In addition, the device 102 has a function of communicating with the management system 101 via the network 104, collects various types of data based on a data collection request received from the management system 101, and transmits them to the management system 101. The various types of data are information on the devices described above.

The information on the devices includes device information (information on devices) and device data.

Device information includes information unique to each device (for example, a device ID, which will be described below), and various types of setting information set in the device 102.

Device data includes usage result information (information such as counters and logs), status information, error information, sensor data, and the like, and is data necessary to realize each service (to be described below) that makes up the management system 101.

The management system 101 uses the device data described above to manage an occurrence status for an error and a failure, a degree of wear of a consumable component, a failure sign status of a component based on sensor data, and the like, and provides these pieces of information to the administrator side.

The customer 103 is a user who uses the plurality of devices 102. In the example shown in FIG. 1, there are a plurality of customers 103. In most cases, a plurality of devices 102 can be used per customer 103. A configuration and the number of devices for each customer 103 and the number of customers 103 are not limited.

The network 104 is, for example, a communication network that is composed of a LAN, a WAN, a telephone line, a dedicated digital line, or the like, or can be realized by a combination of at least two of these. The Internet is typically used as the WAN. An intranet is typically used as the LAN.

<Hardware Configuration of Management System>

Figure 2:
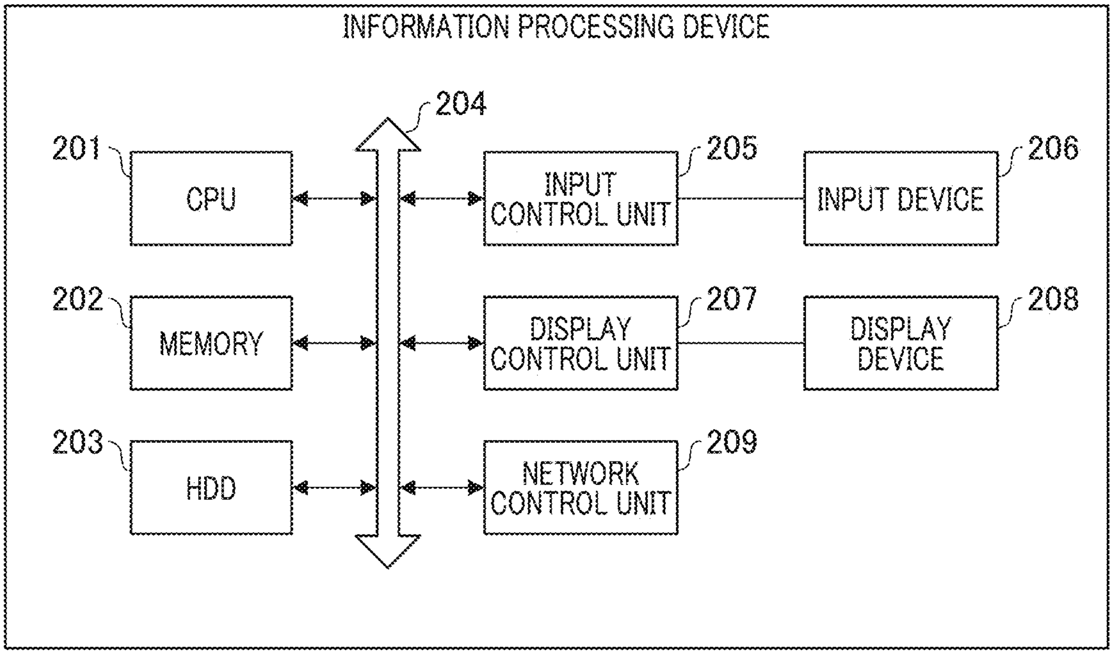
FIG. 2 is a block diagram which shows an example of a hardware configuration of an information processing device that constitutes a management system.

FIG. 2 is a block diagram which shows an example of a hardware configuration of the information processing device that constitutes the management system 101 in the first embodiment.

The management system 101 can be realized by an information processing device provided as a cloud computing service. Examples of cloud computing include serverless computing and virtual machines. In cloud computing, a plurality of hardware resources shown in FIG. 2 are used. Note that the management system 101 may be realized by one physical machine, or may be realized by a plurality of physical machines connected via a network or a physical line. In the example shown in FIG. 2, the management system 101 is configured as one physical machine.

The information processing device that constitutes the management system 101 includes a CPU 201, a memory 202, a hard disk drive (HDD) 203, an input control unit 205, a display control unit 207, a network control unit 209, an input device 206, and a display device 208.

The CPU 201 collectively controls each hardware element connected to a system bus 204.

The memory 202 is a main memory of the CPU 201 and functions as a work area and the like. Moreover, the memory 202 may store programs executed by the CPU 201 in some cases.

The HDD 203 is a large capacity storage device that stores the programs executed by the CPU 201 and also stores various types of other data.

The input control unit 205 controls, for example, an input from the input device 206 such as a mouse or a keyboard. Depending on a role of the information processing device, it may also be configured without the input control unit 205 and the input device 206.

The display control unit 207 controls, for example, a display on the display device 208 such as a liquid crystal display. Depending on the role of the information processing device, it may also be configured without the display control unit 207 and the display device 208.

The network control unit 209 transmits and receives data bidirectionally to and from other nodes via the network 104.

In addition, in FIG. 2, not only the CPU 201 but also a programmable logic device (PLD) such as a field programmable gate array (FPGA) may be used. Alternatively, an application specific integrated circuit (ASIC) may also be used. In addition, other storage devices such as a flash memory, an optical recording device, or a magneto-optical recording device as well as the HDD 203 may be used.

<Functional Configuration>

Figure 3:
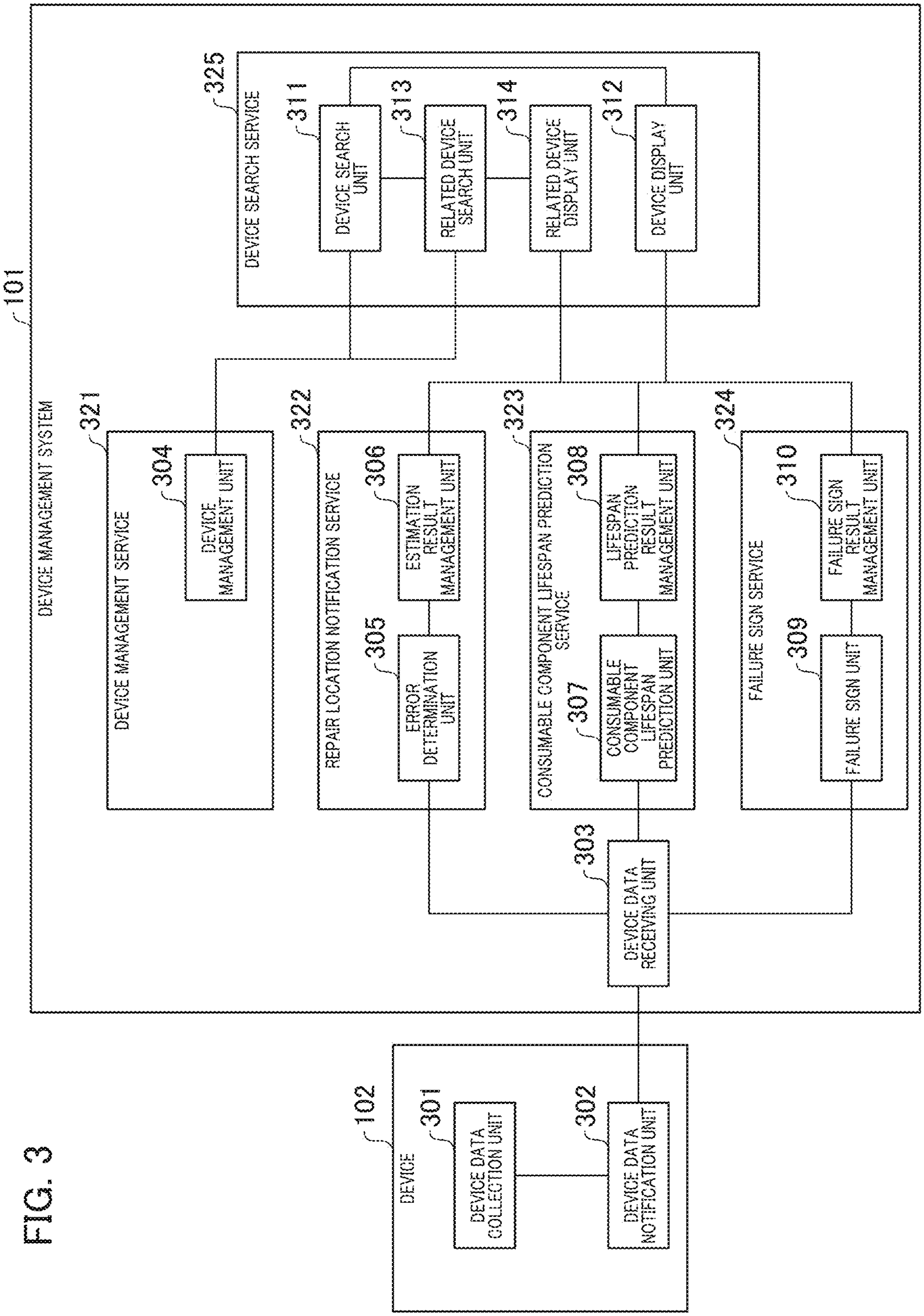
FIG. 3 is a block diagram which shows an example of a functional configuration of the management system and device.

FIG. 3 is a block diagram which shows an example of a functional configuration of the management system 101 and the device 102. The management system 101 includes a device data receiving unit 303, a device management service 321, a repair location notification service 322, a consumable component lifespan prediction service 323, a failure sign service 324, and a device search service 325.

A configuration of each service in the management system 101 is not limited. For example, the management system 101 may have only one service among the repair location notification service 322, the consumable component lifespan prediction service 323, and the failure sign service 324.

The device 102 has a device data collection unit 301 and a device data notification unit 302. The device data collection unit 301 collects various types of data (here, mainly device data) in the device 102 and passes them to the device data notification unit 302.

The device data notification unit 302 transmits the device data collected by the device data collection unit 301 to the management system 101. Note that a management server for collecting data may mediate a collection of device data from the device 102. In this case, the management server can extract data required by the management system 101 from the data transmitted from the device 102 and transmit the extracted data to the device data receiving unit 303.

Although only one device 102 is shown in the example shown in FIG. 3, one or more other devices 102 having a similar functional configuration may be connected to the management system 101.

In the management system 101, the device data receiving unit 303 receives device data transmitted from the device data notification unit 302 of the device 102, and notifies each service of it. In the present embodiment, device data is transmitted to the error determination unit 305, the consumable component lifespan prediction unit 307, and the failure sign unit 309 according to a type of data.

The device management service 321 is a service for managing devices targeted by the management system 101, and includes a device management unit 304. For the device 102 to be managed by this system, the device management unit 304 manages device information including information on the customer 103 to which the device 102 belongs. For example, when the device 102 is connected to the management system 101 for the first time and registration processing with the management system 101 is performed, the management system 101 receives device information.

The device management service 321 is an example of a management means that manages device information set for each device mainly in cooperation with the CPU 201.

The device information includes, for example, customer information to which the device 102 belongs, a device ID (device serial), a model name, and the like. The device information may also include an installation location of the device 102 as setting information. Information on the installation location is, for example, set for each intranet.

The repair location notification service 322 is a service that receives and analyzes error information that occurs in the device 102, and presents information on a location that needs to be repaired. The repair location notification service 322 includes an error determination unit 305 and an estimation result management unit 306.

When the error determination unit 305 receives error information from the device data receiving unit 303, it analyzes the error information and estimates treatment information (replacement, cleaning, adjustment, or the like of components) necessary to eliminate an error. The error determination unit 305 then notifies the estimation result management unit 306 of the estimated treatment information along with the error information. Note that the error information is mainly information on components and functions that have actually failed. In addition, the error information includes, for example, jam information. The treatment information is an example of information on a result of estimating a failure.

The estimation result management unit 306 manages error information occurring in the device 102 and estimated treatment information and provides it to the device search service 325.

The consumable component lifespan prediction service 323 is a service that receives and analyzes the degree of wear (a wear rate) of a consumable component included in the device 102, and presents the number of days remaining until an end of a lifespan of the consumable component. Hereinafter, the number of days remaining until the end of the lifespan of the consumable component will be referred to as the number of days remaining in a lifespan. Information on the number of days remaining in a lifespan is an example of information on a lifespan period of the consumable component. The consumable component lifespan prediction service 323 includes a consumable component lifespan prediction unit 307 and a lifespan prediction result management unit 308.

The consumable component lifespan prediction unit 307 receives the degree of wear of the consumable component from the device data receiving unit 303, obtains the number of days remaining in the lifespan, and notifies the lifespan prediction result management unit 308 of the obtained number of days remaining. As an analysis method for predicting a lifespan of a consumable component, there is a method of obtaining the number of days remaining in the lifespan of the consumable component by, for example, obtaining an amount of change in the wear rate and calculating the number of days until the wear rate of the consumable component will exceed a threshold value. Note that a method for calculating the number of days remaining in a lifespan is not limited, and a plurality of pieces of device data other than the amount of change in wear rate may be handled for the calculation.

The lifespan prediction result management unit 308 manages information on the number of days remaining in a lifespan, notified from the consumable component lifespan prediction unit 307 and provides it to the device search service 325.

The failure sign service 324 is a service that detects an abnormal value by analyzing sensor data, which is detection data of a sensor included in the device 102, and obtains a failure sign of a component. The failure sign service 324 includes a failure sign unit 309 and a failure sign result management unit 310.

The failure sign unit 309 detects an abnormal value by receiving sensor data from the device data receiving unit 303 and analyzing it, and notifies the failure sign result management unit 310 of a failure sign result of the detected component. In the present embodiment, the failure sign unit 309 detects an abnormal value and determines a failure sign, but it may also determine it by machine learning, and there are no restrictions on data or a detection method to be used.

The failure sign result management unit 310 manages a failure sign result of a component and provides it to the device search service 325.

At least one of the repair location notification service 322, the consumable component lifespan prediction service 323, and the failure sign service 324 is an example of an analysis means that analyzes a state of a device on the basis of device data acquired from the device mainly in cooperation with the CPU 201.

The device search service 325 is a service that searches for a device 102 to be managed by the management system 101 and provides information held by each service for the searched device 102. The information held by each service is information managed by the estimation result management unit 306, the lifespan prediction result management unit 308, and the failure sign result management unit 310, respectively.

The device search service includes a device search unit 311, a device display unit 312, a related device search unit 313, and a related device display unit 314.

The device search unit 311 searches for the device 102 which is being managed by the device management unit 304 in accordance with a request (an input instruction) from a user (in this case, a user on the administrator side, hereinafter the same).

The device display unit 312 displays information on a device searched (found by the search) by the device search unit 311 in accordance with a request from the user. Here, the device display unit 312 displays at least device information as information on the device 102. Typically, the device display unit 312 displays information indicating a state of the device 102 together with the device information.

Information indicating the state of the device 102 is information managed by the estimation result management unit 306, the lifespan prediction result management unit 308, and the failure sign result management unit 310. That is, the information indicating the state of the device 102 includes error information, information on a component with a failure sign, information on the number of days remaining in the lifespan, and the like of the device data.

Note that the device display unit 312 may display, for example, other types of information, such as counter information and firmware information of the device 102, in addition to the device information and information indicating the state of the device 102 obtained as a result of the analysis.

The related device search unit 313 searches for other devices 102 that belong to the same group as a group to which the device 102 searched by the device search unit 311 belongs. Hereinafter, devices 102 which are other than the searched device 102 and belong to the same group as the group to which the searched device 102 belongs will be referred to as related devices.

For example, the related device search unit 313 searches for related devices on the basis of the device information of the searched device 102 managed by the device management unit 304. Typically, the related device search unit 313 searches for related devices belonging to the same customer 103 on the basis of customer information (a customer name, a customer ID, or the like) of the customer 103 among the device information.

However, related devices are not limited to devices 102 that are linked to the same customer 103. The user (or engineer) on the administrator side can freely set a group range (group definition). For example, a group may be a collection of devices that have positional information in the same range, such as the same building or address. Alternatively, a group may be a collection of devices set in any unit that the engineer manages, such as a category determined by the engineer.

The related device display unit 314 displays related devices searched by the related device search unit 313 (found by the search). Specifically, the related device display unit 314 displays information on the searched related devices, that is, device information on these devices.

The related device display unit 314 displays information on devices that require treatment based on the information (a result of analysis) managed by the estimation result management unit 306, the lifespan prediction result management unit 308, and the failure sign result management unit 310, and displays information indicating an order of urgency of the treatment. Specifically, the related device display unit 314 displays information on related devices in the order of urgency. In addition to the information on related devices, the related device display unit 314 can also display information indicating the states of the related devices obtained as a result of analysis. A flow for determining the urgency of treatment is shown in the flowchart of FIG. 4.

<Device Search and Display Processing>

Figure 4:
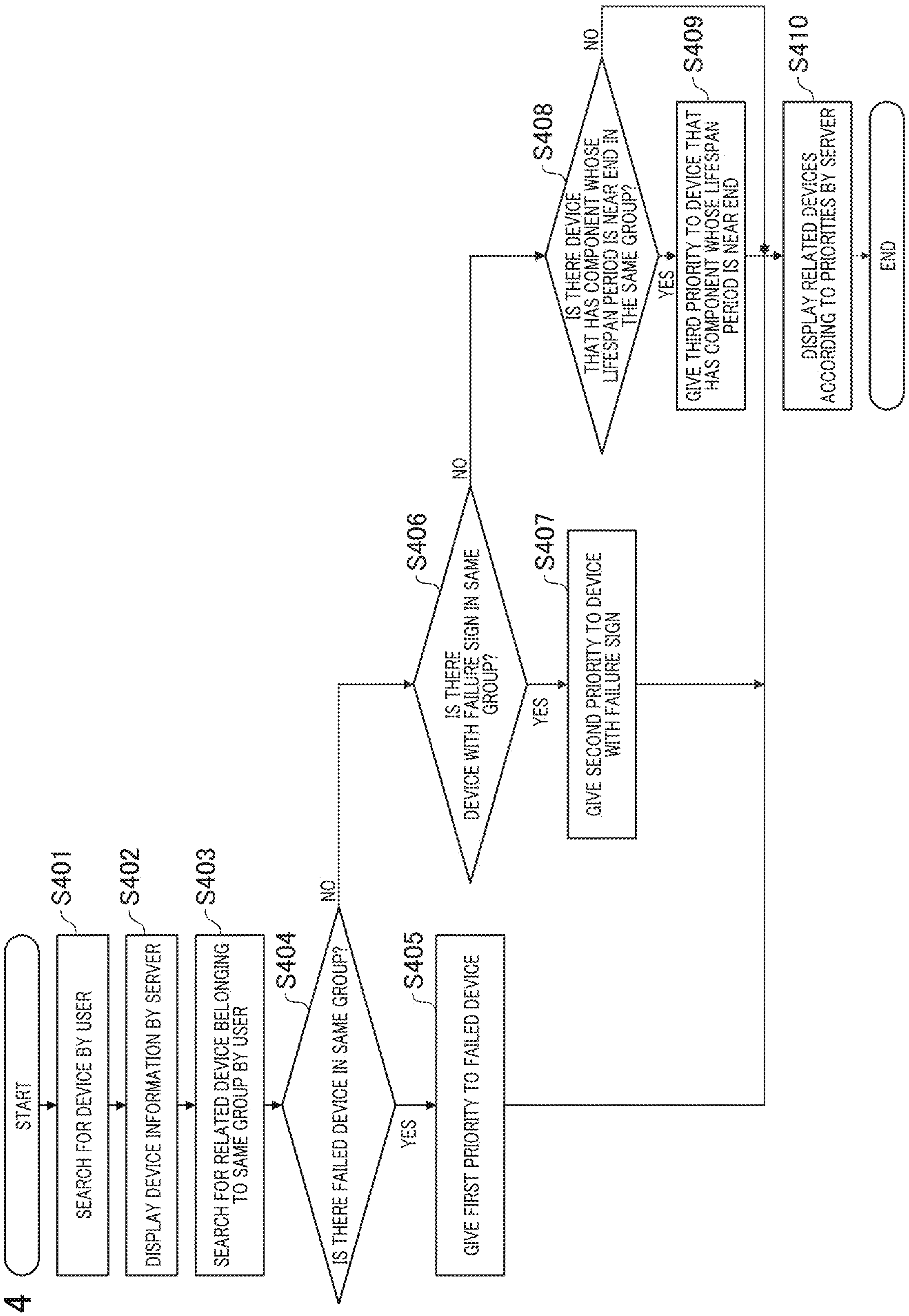
FIG. 4 is a flowchart which shows processing of the device management system.

FIG. 4 is a flowchart which shows processing in which the device search unit 311 searches for a device to be managed by the device management unit 304, the related device search unit 313 searches for devices related to the searched device, and the related device display unit 314 displays them. Note that this processing is realized by the CPU 201 executing a program stored in the HDD 203 or the like. In addition, user interface (UI) data generated in the processing is displayed on the display device 208 via the display control unit 207.

Note that an UI is displayed via the display device 208 of the device management system 101 in the present embodiment, but the UI may be displayed via a separate browser, and a display method is not limited.

In S401, the device search unit 311 searches for the device 102 to be managed by the device management unit 304 in accordance with a request from the user. The device 102 to be searched is, for example, a device that has been notified by a customer side and may require some sort of treatment, but is not limited to such cases. When a corresponding device 102 is not found as a result of the device search, the processing ends.

In the present embodiment, the device search unit 311 performs a device search using a device ID, and displays a corresponding device 102 as a search result under a condition of "prefix matching." Note that the device search unit 311 may perform a device search under a condition of "exact match" using the device ID, or may perform a search using information other than the device ID, and the search method of the device 102 is not limited.

In S402, the device display unit 312 displays device information managed by the device management unit 304 according to a result of the device search in S401. In addition, the device display unit 312 displays information indicating states of devices managed by the estimation result management unit 306, the lifespan prediction result management unit 308, and the failure sign result management unit 310.

The device search unit 311 is an example of a first search means that searches for the device 102 mainly in cooperation with the CPU 201. Moreover, the device display unit 312 is an example of a first display means that displays information on the searched device mainly in cooperation with the CPU 201.

In S403, in accordance with a request from the user, the related device search unit 313 searches for related devices belonging to the same group on the basis of the device information displayed in S402. In the present embodiment, the related device search unit 313 searches for other devices 102 included in the customer 103 to which the device 102 belongs, as related devices.

The related device search unit 313 is an example of a second search means that searches for at least devices requiring treatment, which are related to the searched device, as related devices on the basis of information on the searched device mainly in cooperation with the CPU 201.

In S404 to S409, the related device display unit 314 determines a priority of the related devices to be displayed, and sorts and displays the related devices according to the priority. Note that instead of the related device display unit 314 determining the priority of the related device, an analysis function (analysis means) may determine it.

In S404, the related device display unit 314 determines whether the searched related devices are failed devices (devices having a failed component or a failed function) in which an error has occurred. For example, the device 102 that is a source of error information and requires treatment corresponding to treatment information estimated by the estimation result management unit 306 is determined to be a failed device. In this manner, when it is determined that a failed device is present, the processing transitions to S405, and when it is determined that a failed device is not present, the processing transitions to S406.

In S405, the related device display unit 314 regards the device 102 determined to be malfunctioning as a device that requires treatment with first priority. The related device display unit 314 displays related devices in an order of urgency in step S410 according to the priority set here.

In S406, the related device display unit 314 determines whether the searched related devices are devices with a failure sign. For example, the device 102 that has component information in which a failure sign to be managed by the failure sign result management unit 310 has been detected is determined to be a device with a failure sign. When it is determined that the device 102 has a failure sign, the processing transitions to S407, and when it is determined that the device 102 does not have a failure sign, the processing transitions to S408.

In S407, the related device display unit 314 regards the device 102 determined to have a failure sign as a device with second priority. The related device display unit 314 displays related devices in an order of urgency in step S410 according to the set priority.

In S408, the related device display unit 314 determines whether a lifespan period of a component contained in the searched related devices is near the end. For example, the device 102 that has a component whose number of days remaining in the lifespan, which is managed by the lifespan prediction result management unit 308, is within a threshold value is regarded as a device that has a component whose lifespan period is near the end. In the following description, the device that has a component whose lifespan period is near the end is sometimes referred to as a device with a near-lifespan component. The threshold value for the number of days remaining in the lifespan described above may be set for each device 102 or may be a fixed value, and a method of setting the threshold value is not limited. When it is determined that the related devices are devices with a near-lifespan component, the processing transitions to S409, and when it is determined that the related devices are not devices with a near-lifespan component, the processing transitions to S410.

In S409, the related device display unit 314 regards the device with a near-lifespan component as a device with third priority. The related device display unit 314 displays related devices in the order of urgency in step S410 according to the set priority.

In S410, the related device display unit 314 sorts and displays related devices in the order of urgency according to the first, second, and third priorities set in S405, S407, and S409, respectively. In the present embodiment, the related device display unit 314 considers that an urgency level is highest in the order of a related device with first priority, a related device with second priority, and a related device with third priority, and sorts and displays these related devices.

Note that the related device display unit 314 does not display a device for which priority has not been set as a related device. However, devices for which priority has not been set may also be displayed as devices with low urgency, and there is no restriction on a display order of devices with low urgency.

The related device display unit 314 is an example of a second display means that displays information indicating the order of urgency of related devices that require treatment, which is searched mainly in cooperation with the CPU 201.

<Example of GUI>

Figure 5:
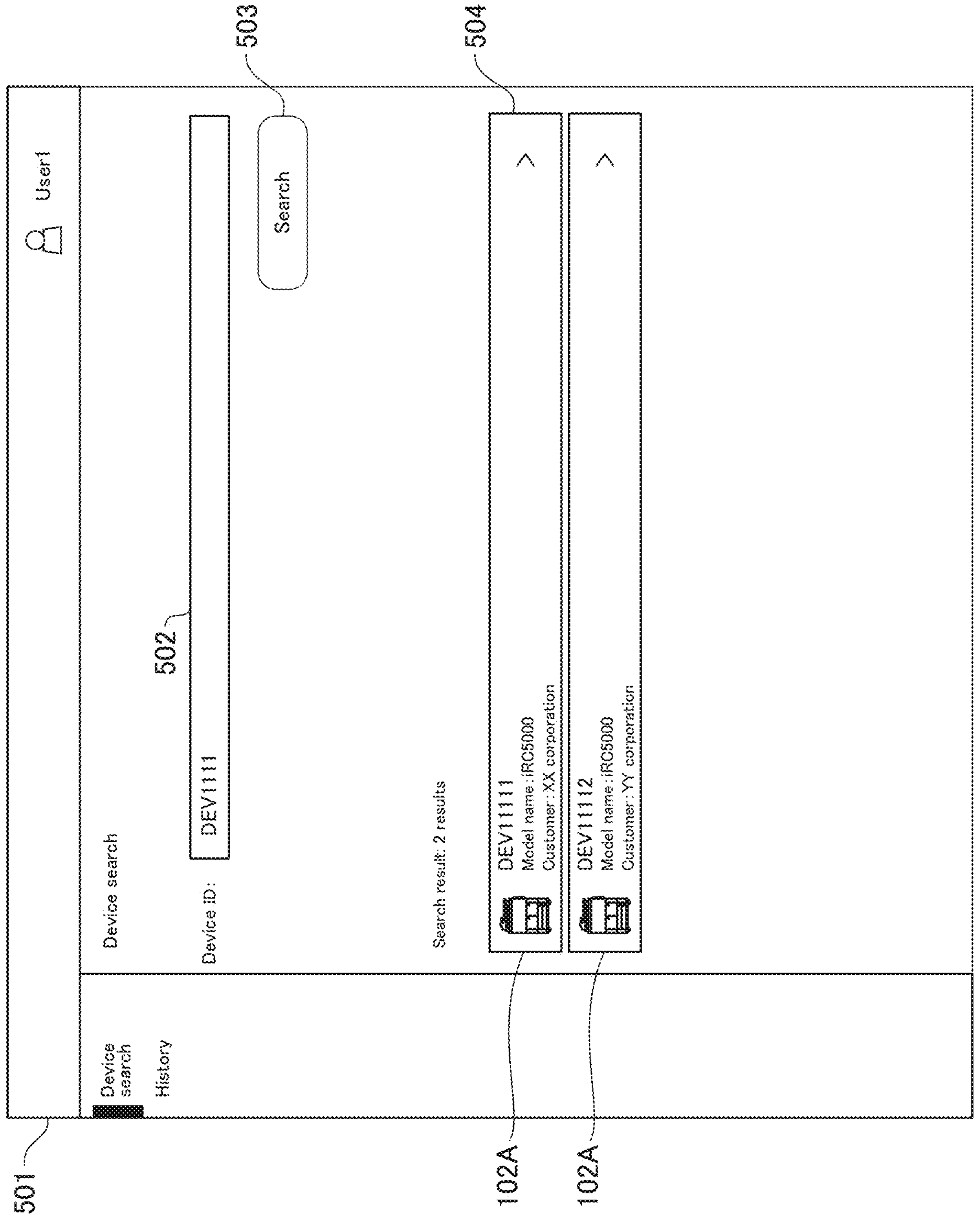
FIG. 5 is a diagram which shows an example of a device search screen.

Next, an example of a graphical user interface (GUI) until the management system 101 sorts and displays related devices according to a flow shown in FIG. 4 will be described with reference to FIGS. 5 to 7. FIG. 5 is a diagram which shows an example of the device search screen.

A device search screen 501 is a screen on which the device search unit 311 searches for the device 102 to be managed by the device management unit 304. The device search screen 501 includes a device search box 502, a device search button 503, and a device search result list 504.

The device search box 502 is an input field for specifying a device ID of the device 102 for which the user wants to search. In the example shown in FIG. 5, the device 102 is searched by specifying the device ID, but any type of information can be specified as long as it has an attribute that allows the device 102 to be searched, such as a friendly name of the device 102.

The device search button 503 is a button for executing a search for the device 102 according to a device ID input in the device search box 502. When the device search button 503 is pressed, a result of the search is displayed in the device search result list 504.

The device search result list 504 displays devices 102 that meet a search condition in the device search in a list along with information on devices managed by the device management unit 304. Hereinafter, the device 102 searched (found by the search) by the device search unit 311 will be referred to as a device 102A. In the present embodiment, devices (two devices, DEV11111 and DEV11112) that have device IDs whose prefixes match the device ID (DEV11111) specified in the device search box 502 are displayed as a result of the search.

Note that in the example shown in FIG. 5, device information (device ID, model name, customer name) is displayed as the information of the device 102A, but device data may be further displayed, and the displayed information is not limited.

When the user selects one device 102A from the one or more devices 102A displayed in the device search result list 504, a screen transitions to a device alert list screen 505. Hereinafter, one device selected by the user among the one or more searched devices 102A will be referred to as a device 102AS.

Figure 6:
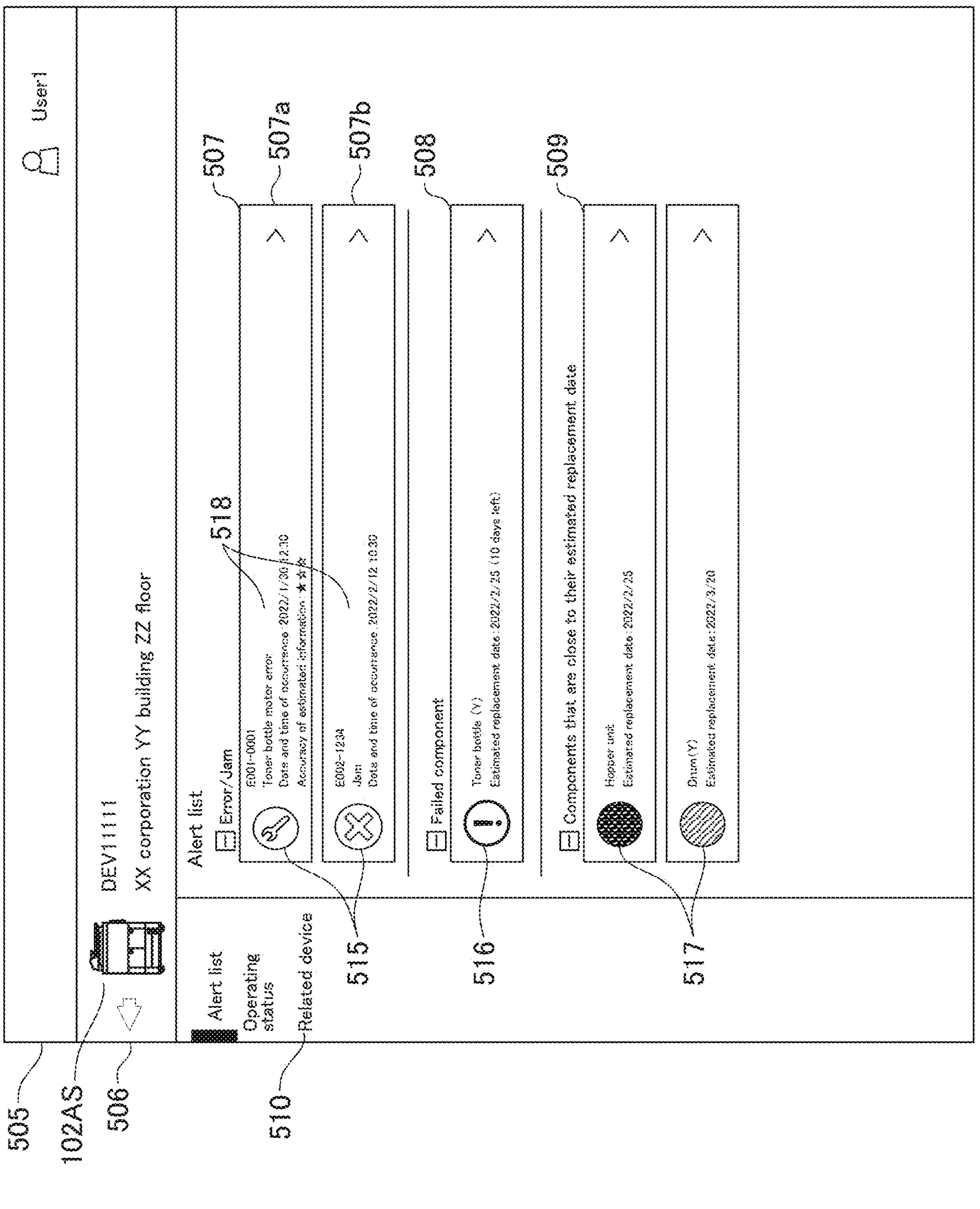
FIG. 6 is a diagram which shows an example of a device alert list screen.

FIG. 6 is a diagram which shows an example of the device alert list screen 505. The device alert list screen 505 displays an alert list as information indicating a state of one device 102AS selected in the device search result list 504. The device alert list screen 505 includes a selected device information 506, an error information list 507, a list of failed components (failure sign components) 508, and a list of components that are close to their estimated replacement date 509. Note that the error information list 507 also includes jam information.

The selected device information 506 indicates device information of the device 102AS. In the example shown in FIG. 6, information on a device ID (DEV11111), a customer name (XX Corporation), and an installation location (YY building/ZZ floor) is displayed. However, other types of information such as a model name may also be displayed.

The error information list 507 displays error information that has occurred in the device 102AS in a list on the basis of the error information and the treatment information managed by the estimation result management unit 306. In the example shown in FIG. 6, one piece of error information 507*a* and one piece of jam information 507*b* are displayed.

Regarding the error information 507*a*, an icon 515 and other information 518 are shown. Other information includes, for example, an error code, an error name, an error occurrence date and time, and an accuracy of treatment information (an accuracy of estimated information). The accuracy of treatment information represents an accuracy of a result of the estimation by the estimation result management unit 306, that is, an accuracy of estimated treatment information.

Regarding the jam information 507*b*, the icon 515 is similarly shown, and the other information 518 shows an error code of a jam and a jam occurrence date and time.

A failed component list 508 displays a list of components that are regarded to have a failure sign in the device 102AS on the basis of a failure sign result managed by the failure sign result management unit 310. In the example shown in FIG. 6, one item is displayed. As failed component information, an icon 516, a component name, and a deadline for failure prediction based on failure sign information are displayed. Note that other types of component information such as a component number may be displayed as the failure component information.

The list of components that are close to their estimated replacement date 509 displays a list of components (components contained in the device 102AS) that are near the end of their lifespan period, managed by the lifespan prediction result management unit 308 on the basis of the number of days remaining in their lifespan. In the example shown in FIG. 6, two items are displayed.

Moreover, in the example shown in FIG. 6, as information on a component that is near the end of the lifespan period, an icon 517 indicating that the lifespan period is near the end, a component name, and an estimated replacement date (or the number of days remaining in the lifespan) are shown. For example, on the basis of a first threshold value of an estimated date of a component that requires immediate replacement and a second threshold value of an estimated date of a component that can be inferred to be replaced at the same time, two or three types of icons can be set for each degree of urgency. In the example shown in FIG. 6, icons of different colors can be set for each degree of urgency. Not only the color but also the shape, the pattern, and/or the like may be set for each degree of urgency.

The related device menu 510 is a menu that transitions to a related device display screen 511 that displays the device 102 related to the device 102AS.

Figure 7:
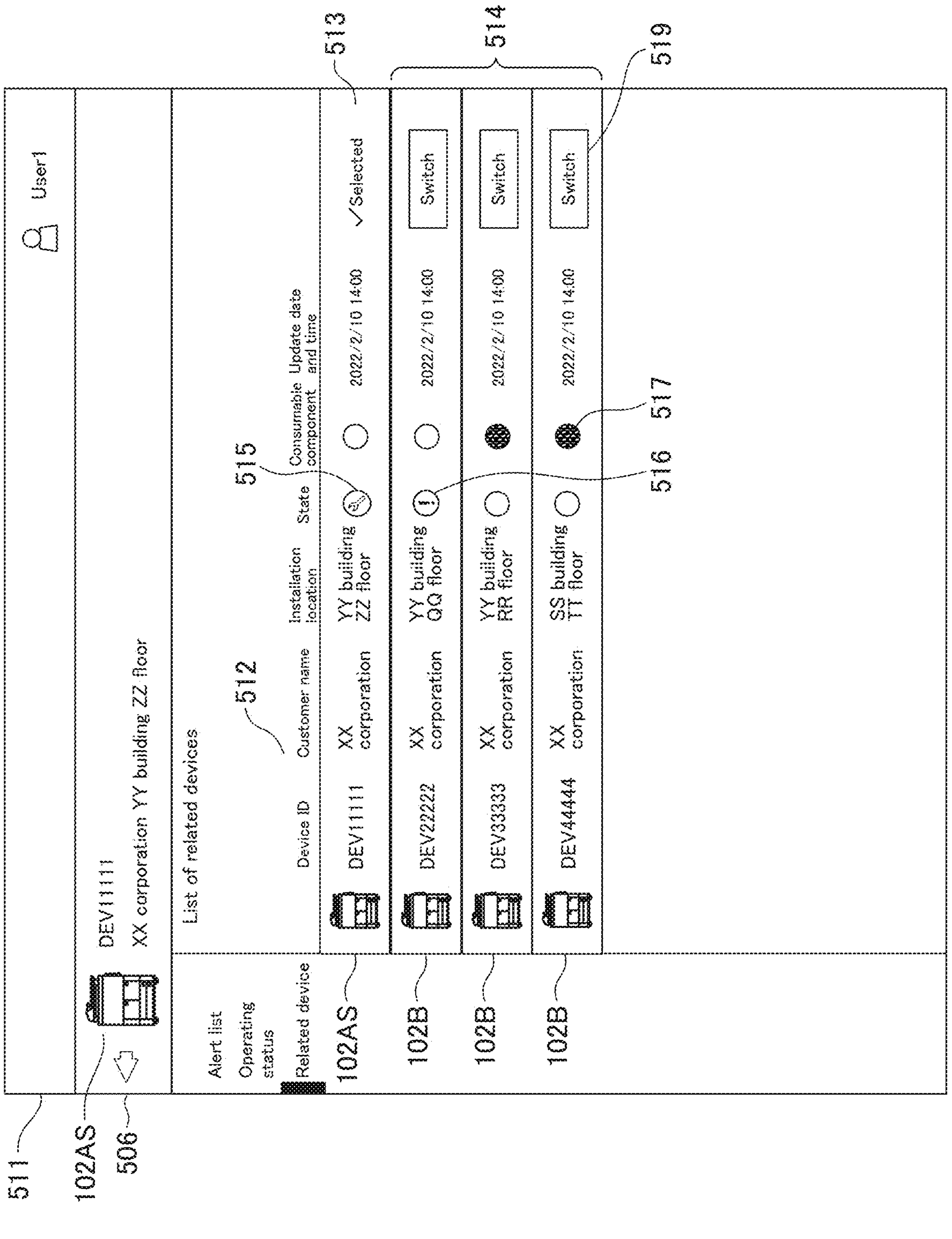
FIG. 7 is a diagram which shows an example of a related device display screen.

FIG. 7 is a diagram which shows an example of the related device display screen 511. The related device display screen 511 is a screen that displays information on one or more related devices 102 searched by the related device search unit 313 on the basis of information on the device 102AS. Hereinafter, the devices 102 searched by the related device search unit 313 will be referred to as related devices 102B.

The devices 102, which are found by the search by the related device search unit 313 on the basis of the customer information to which the device 102AS belongs and which belong to the same customer 103, are displayed as the related devices 102B. Then, the related device display screen 511 displays device information as information on the related devices 102B.

The related device display screen 511 displays information on these related devices 102B in a descending order of the urgency of treatment according to the flow in FIG. 4 (a related device list 512). Information on devices for which priority has not been set (no treatment is required) is not displayed here. However, for example, devices for which priority has not been set in a separate column may also be displayed.

The related device list 512 displays the related devices 102B in the order of the urgency of treatment, for example, from top to bottom, on the basis of the priorities determined according to S404 to S409 shown in FIG. 4. A currently selected device display field 513 displays information on the device 102AS that has been searched and selected on the device search screen 501 (a device that has been a search source when the related device display screen 511 is opened). In the example shown in FIG. 7, this device 102AS is displayed at a top of the related device list 512.

Note that the related device list 512 may not include the device display field 513. In other words, the device 102AS that is the search source does not need to be displayed in the related device list 512.

The related device display field 514 displays one or more related devices 102B searched by the related device search unit 313. When one related device 102B is selected from the related device display field 514 by the user, the device search service 325 switches the device 102AS that is the search source and displays the device alert list screen 505 (FIG. 6). For example, when DEV22222 in the related device display field 514 is selected (a switch button 519 is pressed), the device alert list screen 505 is displayed and information on DEV22222 is displayed in the selected device information 506.

In the related device list 512, in addition to a device ID, a customer name, and an installation location, an icon 515 indicating that a failure such as an error or a jam has occurred, an icon 516 indicating that there is a failure sign, and the like are displayed for each device. In addition, an icon 517 indicating that there are components whose lifespan periods are near the end is displayed on each of devices DV33333 and DV44444. Furthermore, an update date and time when the state of a device has been updated after receiving the device data is displayed.

The related device list 512 displays these related devices 102B in the descending order of the urgency of treatment, as described above, on the basis of the priorities determined according to S404 to S409 shown in FIG. 4. The related device list 512 may be displayed in a visually easy-to-understand manner, such as by color-coding according to the degree of urgency.

Conventionally, an engineer on the administrator side of the management system 101 checks work required to repair a single device and is dispatched, for example, on the basis of a request for dispatch to treat the device. Here, information that the engineer receives in the dispatch request is serial information of a requested device, and it may not be possible to check other devices that require repair or component replacement in the field when responding to the dispatch request.

In contrast, the management system 101 according to the present embodiment provides information on related devices 102B that are related to the searched device 102A and require treatment. That is, the engineer can obtain not only information on the searched device 102A but also the information on related devices 102B that are related to the searched device 102A and require treatment. Then, for example, when the related devices 102B are devices belonging to the same customer as a customer using the device 102A, the engineer may also respond to the related devices 102B in the field when responding to the searched device 102A for treatment. Therefore, engineers can be dispatched efficiently, and work efficiency on the administrator side including engineers is improved.

Additionally, in the present embodiment, when there are a plurality of related devices 102B that require treatment, the order of urgency is displayed. As a result, the engineer can quickly and easily recognize the degree of urgency, that is, the priority of treatment, just by looking at the display screen (the related device display screen 511 shown in FIG. 7). In other words, in the present embodiment, it is possible for engineers to respond more efficiently to devices that require treatment, and the work efficiency on the administrator side including engineers can be further improved.

Second Embodiment

Figure 8:
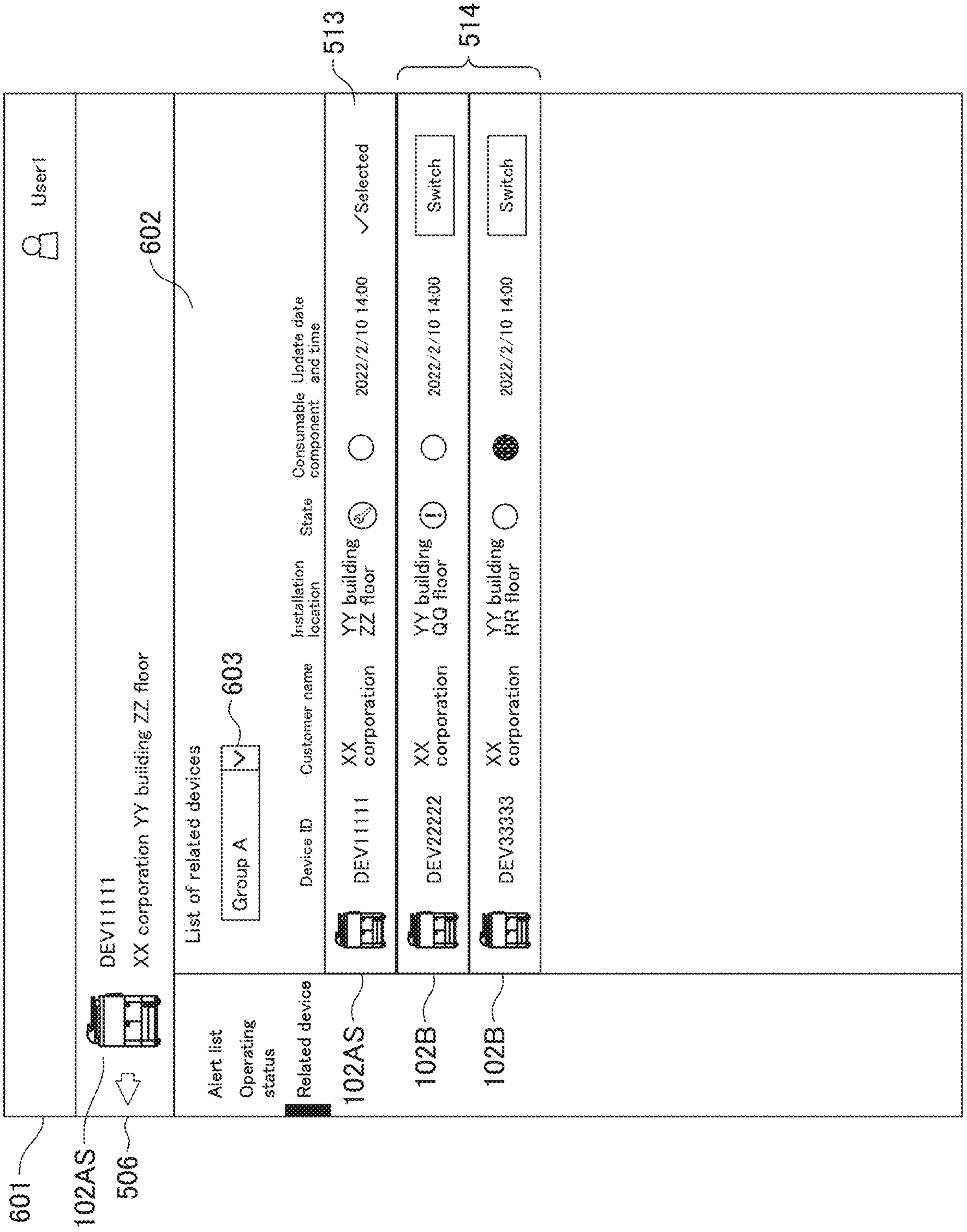
FIG. 8 is a diagram which shows an example of a related device display screen according to a second embodiment.

Next, an example of a GUI in a second embodiment will be described. FIG. 8 is a diagram which shows an example of a related device display screen as the GUI. Hereinafter, descriptions of components similar to the constituents, functions, and processing in the first embodiment described above will be omitted or simplified.

As described above, this related device display screen 601 displays information on the related device 102B based on the information on the device 102AS searched and selected on the device search screen 501. The present embodiment differs from the first embodiment in that a related device list 602 includes a group selection button 603. In the present embodiment, since one device may belong to a plurality of groups, a group can be selected using the group selection button 603. Note that although the group selection button 603 can be selected in a pull-down format, a selection format is not limited to this method.

The related device list 602 displays information on the related devices 102B that belong to a group ("group A" in FIG. 8) selected by the user via the group selection button 603. By switching groups using the group selection button 603, the related device list 602 can display a list of the related devices 102B belonging to another group.

Note that, similar to the first embodiment, the related device list 602 does not need to include the device display field 513.

In the present embodiment, by switching the group selection button 603, the related device list 602 displays the related device 102B, which belongs to a group to which the device 102AS belongs and which is switched another group. However, the related device list 602 may display devices of all groups to which the selected device 102AS belongs as a list of the related devices 102B, and each group may be displayed for displayed items. In the following description, an example will be described in which the plurality of groups to which one device (the selected device 102AS) belongs are collectively displayed.

Figure 9:
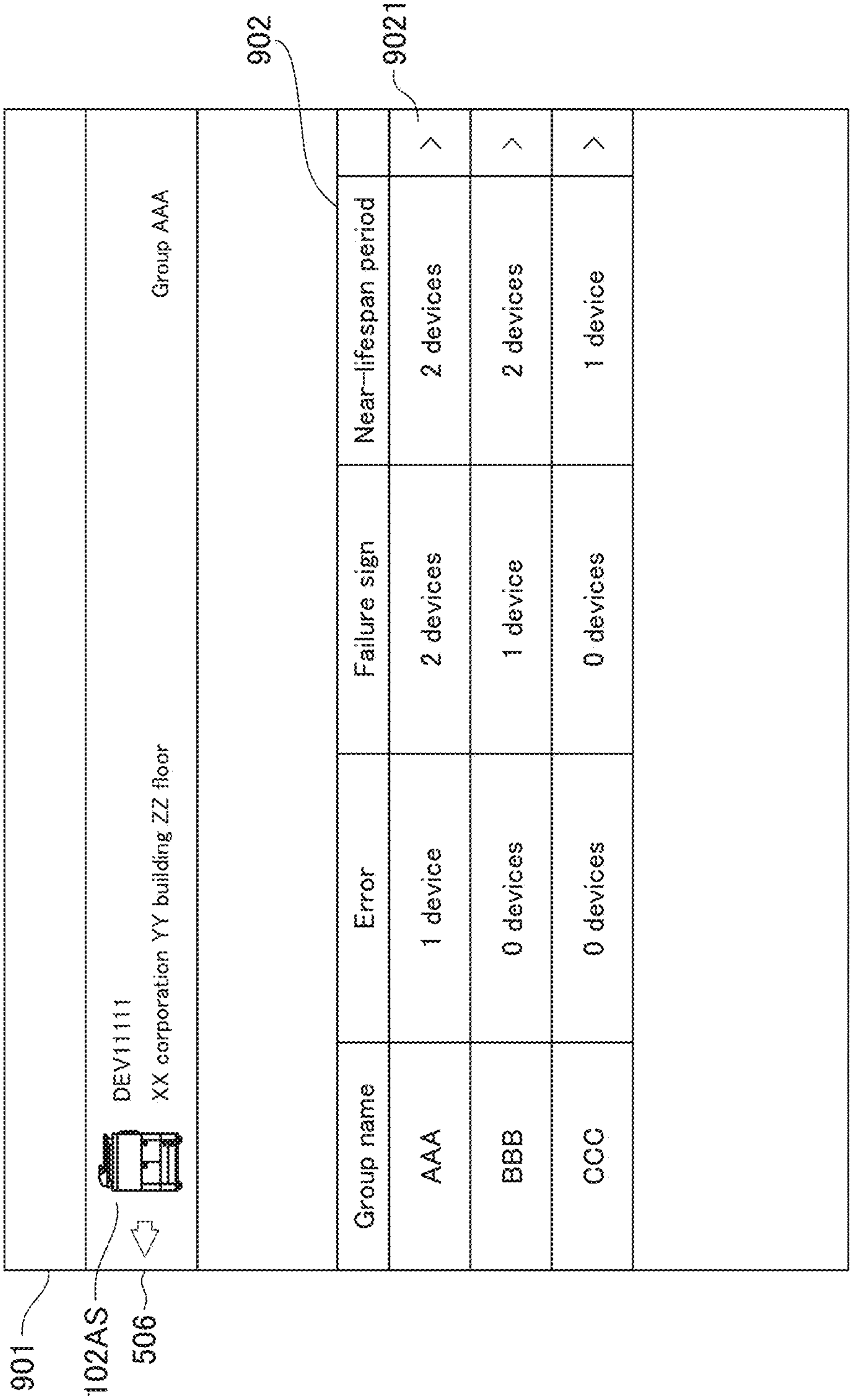
FIG. 9 is a diagram which shows an example of a group list screen that displays all groups to which one device belongs.

FIG. 9 is a diagram which shows an example of a group list screen that displays all groups to which one device 102AS belongs. The group list screen 901 includes a group display field 902 that displays information on the group to which the device 102AS belongs. The information on the device 102AS is displayed as the selected device information 506.

In the example shown in FIG. 9, the group display field 902 displays three groups with group names "AAA," "BBB," and "CCC," and the number of related devices 102B that require treatment is displayed for each group. Moreover, other types of detailed information may be displayed.

Then, this group list screen 901 displays information indicating the order of urgency of the groups according to the total number of these devices, and the groups are displayed in the order of urgency herein. The larger the total number of devices, the higher the degree of urgency, and is displayed at the top, for example.

The device search service 325 and the like are an example of a third display means that displays information indicating an order of urgency of these groups on the basis of information of a related device that requires treatment, in cooperation with the CPU 201.

In FIG. 9, for example, in the group AAA, a total of four devices, such as one related device with a failure such as an error, one related device that is regarded to have a failure sign, and two devices with near-lifespan components, are shown. The degree of urgency may be determined by, for example, the number of items with the highest degree of urgency (for example, an occurrence of a failure such as an error), instead of the total number of all items. A configuration may be provided such that the items can be sorted by the total number of all items and the number of items with the highest degree of urgency according to an input instruction from the user. The group display field 902 may be displayed in a visually easy-to-understand manner, such as by color-coding according to the degree of urgency.

In the case of the present embodiment, it is desirable that the number of devices including the device 102AS that is the search source be displayed as the number of devices displayed in the group display field 902, but this does not necessarily have to be the case.

When a selection button 9021 in the group display field 902 is pressed by the user, the related device display unit 314 displays a display screen of information on related devices of all groups, related to the device 102AS. FIG. 10 is a diagram which shows an example of the related device display screen of all the groups.

When the order of urgency of groups is displayed, a related device display screen 1001 displays the related devices 102B belonging to the groups for each group in the order of urgency from the top. That is, within one group, one or more related devices 102B are displayed in the order of urgency from the top. Here, the devices including the device 102AS that is the search source are also displayed in the order of urgency, but this does not necessarily have to be the case. As the information on the related devices 102B, each type of information, such as a device ID, a customer name, a state (a failure and a failure sign), a consumable component (a component whose lifespan period is near the end), an update date and time, may be displayed in each column. In the related device display screen 1001, the information may be displayed in a visually easy-to-understand manner, such as by color-coding according to the degree of urgency.

As described above, in the present embodiment, when the selected device 102AS belongs to a plurality of groups, the groups are displayed in the order of urgency, so that the engineer can easily understand the degree of urgency of each group. Therefore, the work efficiency on the administrator side is improved. In addition, by simply pressing the selection button 9021 corresponding to a group, the engineer can understand the information on the related devices 102B in that group that require treatment in the order of urgency.

OTHER EMBODIMENTS

In each of the embodiments described above, the related device display screens 511 and 601 display at least the related devices 102B that require treatment in the order of urgency from the top. However, they do not necessarily have to be displayed in the order of urgency, and the related device display screens 511 and 601 only need to display information indicating the order of urgency. Display information for the related devices 102B arranged from the top in the order of urgency is an example of "the information indicating the order of urgency."

Examples of the information indicating the order of urgency may include, for example, a character string and/or an image indicating the order. Moreover, the order of urgency may be expressed by a size, an intensity, or the like of an image representing the information on the related devices 102B.

In addition, similarly in the group list screen 901 shown in FIG. 9, the display is not limited to a form in which groups are displayed in the order of urgency, but information indicating the order of urgency of the groups may also be displayed.

In each of the embodiments described above, the degree of urgency is set according to the three device states: an error (failure) occurrence, a failure sign, and a consumable component. However, the related device search unit 313 and the related device display unit 314 may search for related devices and display them in the order of urgency on the basis of at least one of these three states.

For example, in the list of components that are close to their estimated replacement date 509 in FIG. 6, two or more levels of urgency (the first threshold value, the second threshold value) have been set for the estimated date of components replacement. That is, in this case, the related device search unit 313 and the related device display unit 314 can display the related devices 102B in the order of urgency according to a state of the consumable component.

In addition, the related device search unit 313 and the related device display unit 314 can perform search and display on the basis of the number of components (components with an error occurrence (failure), components with a failure sign, or consumable components). As the number of components with an error occurrence, components with a failure sign, or consumable components of a related device increases, the degree of urgency (priority) is increased.

Alternatively, it is possible to imagine a case in which the priority is determined in advance for each type of components, for example, without being limited to the number of components. When these components are failed components, components with a failure sign, or consumable components, devices that have those components may be displayed in the order of urgency according to their priority.

In the processing shown in FIG. 4, priorities have been determined such that the second priority is given to a device with a failure sign, and the third priority is given to a device with a near-lifespan component. However, conversely, the priorities may also be determined such that the second priority is given to a device with a near-lifespan component, and the third priority is given to a device with a failure sign.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-107294, filed Jun. 29, 2023, which is hereby incorporated by reference wherein in its entirety.

What is claimed is:

1. An information provision system comprising:
one or more memories storing instructions; and
one or more processors configured to execute the instructions to:
search for a device,
display a first screen that includes information on the searched device and the information indicating a state of the device, wherein the information indicating the state of the device includes information on a result of estimating a failure, information on a failure sign result, and information on a lifespan period of a consumable component,
search for other devices that are related to the searched device that require treatment as related devices based on information on the searched device,
display a second screen that includes information indicating an order of urgency of the related devices that require the treatment, and
display a third screen that includes information on a result of estimating a failure, information on a failure sign result, and information on a lifespan period of a consumable component as information indicating a state of a related device selected from the related devices,
wherein the first screen further includes a first button for transitioning to the second screen, and
wherein the second screen further includes a plurality of second buttons for transitioning to the third screen, each of the plurality of second buttons being displayed in association with a respective related device.

2. The information provision system according to claim 1, wherein the one or more processors further execute the instructions to cause the information provision system to perform an analysis of the state of the device based on device data acquired from the device.

3. The information provision system according to claim 2, wherein the one or more processors further execute the instructions to cause the information provision system to display the information indicating the state of the device based on a result of the analysis.

4. The information provision system according to claim 3, wherein the one or more processors further execute the instructions to cause the information provision system to display information indicating states of the related devices and information indicating the order of urgency based on a result of the analysis.

5. The information provision system according to claim 3, wherein the one or more processors further execute the instructions to cause the information provision system to generate the information indicating the state of the device according to the analysis, and
wherein the information indicating the order of the urgency of the related devices is displayed based on the generated information indicating the state of the device.

6. The information provision system according to claim 1, wherein the devices that require the treatment and belong to a same group as a group to which the searched device belongs are searched for as the related device based on the information on the device.

7. The information provision system according to claim 6, wherein, when the searched device belongs to a plurality of groups, the one or more processors further execute the instructions to cause the information provision system to display information indicating an order of urgency of the plurality of groups based on information on the related devices that require the treatment.

8. The information provision system according to claim 7, wherein, when the information indicating the order of urgency of the plurality of groups is displayed, information indicating the order of urgency of the related devices requiring the treatment is displayed for each group.

9. The information provision system according to claim 1, wherein the searched related devices are displayed in the order of urgency along with information indicating the order of urgency.

10. A method in an information provision system comprising:
searching for a device;
displaying a first screen that includes information on the searched device and the information indicating a state of the device, wherein the information indicating the state of the device includes information on a result of estimating a failure, information on a failure sign result, and information on a lifespan period of a consumable component, searching for other devices that are related to the searched device that require treatment as related devices based on information on the searched device;

displaying a second screen that includes information indicating an order of urgency of the related devices that require the treatment, and display a third screen that includes information on a result of estimating a failure, information on a failure sign result, and information on a lifespan period of a consumable component as information indicating a state of a related device selected from the related devices, wherein the first screen further includes a first button for transitioning to the second screen, and wherein the second screen further includes a plurality of second buttons for transitioning to the third screen, each of the plurality of second buttons being displayed in association with a respective related device.

11. The method according to claim 10, further includes performing an analysis of the state of the device based on device data acquired from the device.

12. The method according to claim 11, further includes displaying the information indicating the state of the device based on a result of the analysis.

13. The method according to claim 12, further includes displaying information indicating states of the related devices and information indicating the order of urgency based on a result of the analysis.

14. The method according to claim 12, further includes generating the information indicating the state of the device according to the analysis, and wherein the information indicating the order of the urgency of the related devices is displayed based on the generated information indicating the state of the device.

15. The method according to claim 10, wherein the devices that require the treatment and belong to a same group as a group to which the searched device belongs are searched for as the related device based on the information on the device.

16. The method according to claim 15, further includes displaying, when the searched device belongs to a plurality of groups, information indicating an order of urgency of a plurality of groups based on information on the related devices that require the treatment.

17. The method according to claim 16, wherein, when the information indicating the order of urgency of the plurality of groups is displayed, information indicating the order of urgency of the related devices requiring the treatment is displayed for each group.

18. The method according to claim 10, wherein the searched related devices are displayed in the order of urgency along with information indicating the order of urgency.

* * * * *